United States Patent [19]

Bitler

[11] Patent Number: 6,122,085
[45] Date of Patent: *Sep. 19, 2000

[54] LIGHTWAVE TRANSMISSION TECHNIQUES

[75] Inventor: Jesse Samuel Bitler, Andover, Mass.

[73] Assignee: Lucent Technologies Inc., Murray Hill, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/835,450

[22] Filed: Apr. 8, 1997

[51] Int. Cl.[7] .............................. H04B 10/00; H04B 10/04
[52] U.S. Cl. .......................... 359/180; 359/161; 359/187
[58] Field of Search ................................. 359/180, 187, 359/161

[56] References Cited

U.S. PATENT DOCUMENTS

| | | | |
|---|---|---|---|
| 5,252,930 | 10/1993 | Blauvelt | 330/149 |
| 5,321,710 | 6/1994 | Cornish et al. | 372/26 |
| 5,424,680 | 6/1995 | Nazarathy et al. | 330/149 |
| 5,481,389 | 1/1996 | Pidgeon et al. | 359/161 |

Primary Examiner—Jason Chan
Assistant Examiner—Dalzid Singh

[57] ABSTRACT

A predistortion technique for adding a controlled amount of distortion to a radio-frequency (rf) drive signal of a laser in a lightwave transmitter. The magnitude of the added distortion approximates the distortion inherently produced by the laser. Additionally, the phase of the added distortion is substantially 180 degrees different from the distortion produced by the laser. Hence, the added distortion effectively cancels the distortion produced by the laser. The lightwave transmitter comprises a signal conditioner, a predistorter, a high-power rf amplifier circuit and a laser. The signal conditioner processes rf signals received from an rf input circuit. The processed rf signals are passed to the predistorter, which splits the rf signals into two portions. One of the split portions, which includes a major amount of the rf signal, passes through a delay circuit to an input of the combiner. The other split portion passes to diode circuits that selectively generate second- and third-order distortion products. A low-power rf amplifier circuit processes these second- and third-order distortion products before the signal combiner combines them with the main rf signal. The combined signals, which contain a controlled amount of distortion are amplified in the high-power amplifier to form the laser's rf drive signal.

28 Claims, 4 Drawing Sheets

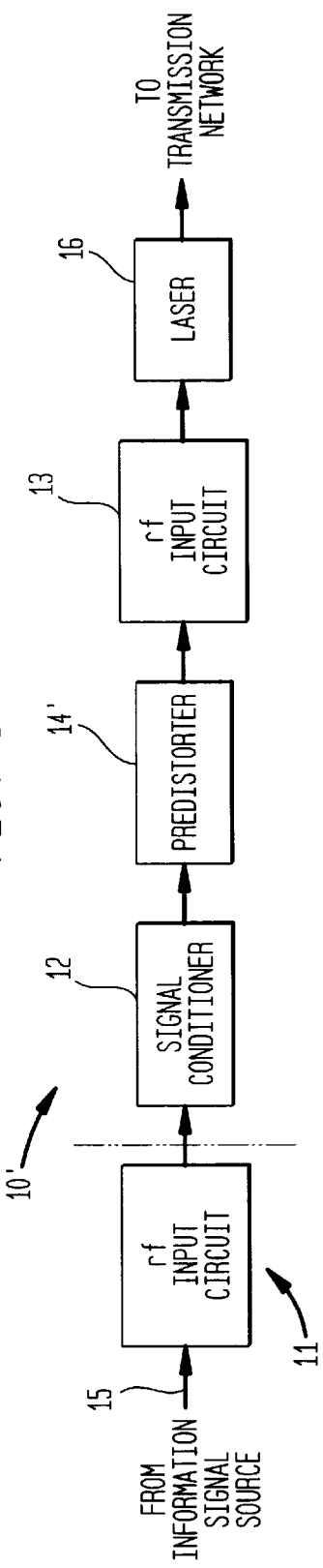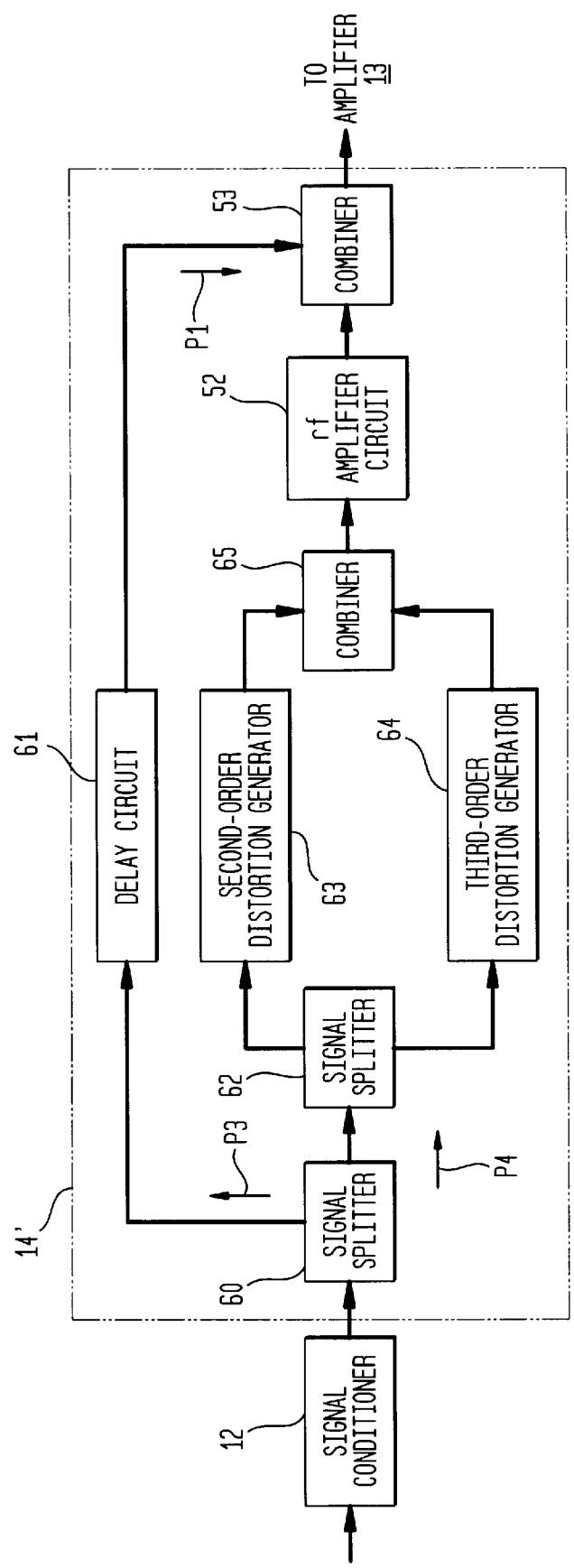

LIGHTWAVE TRANSMISSION TECHNIQUES

FIELD OF THE INVENTION

This invention relates in general to lightwave transmission systems and methods, and more particularly to a predistortion technique for enhancing the performance of lightwave transmitters.

BACKGROUND OF THE INVENTION

Conventional telecommunication networks frequently comprise a lightwave transmission system designed to carry modulated light energy containing audio and/or video signals, or coded digital information. For example, current cable television (CTV) networks usually contain a lightwave transmission system designed to transmit conventional CTV signals over optic fiber lines. In many of these cable networks, the CTV signals are directly modulated onto a laser beam while an optical fiber network carries the modulated laser beam to a distribution point where the CTV signals are then put onto a coaxial transmission line for delivery to subscribers.

Many conventional CTV systems can transmit signals having over one hundred separate video channels, often starting at about fifty megahertz (MHz) and ending at about 750 MHz. Such CTV systems generally include a laser circuit in which CTV signals modulate a laser via a radio-frequency (rf) drive circuit. Since a typical laser's transfer function is not completely linear, a modulated laser beam will usually contain an extremely large number of distortion products. These undesired signal distortions can substantially degrade the ultimate television pictures.

It is generally well known that when an active laser in a lightwave transmission system is properly biased and not driven too hard, the nonlinear portion of that laser's transfer function, i.e., the distortion terms, will be primarily contained in second- and third-order terms. Skilled artisans usually refer to the second-order terms as the "composite second-order" (CSO) terms, and the third-order terms as the "composite third-order" or "composite triple-beat" (CTB) terms. The CSO and CTB terms are essentially noise-like signals that can be measured in a prescribed channel, and can be referenced to the carrier in that channel. One apparent way of reducing the magnitude of these CSO and CTB terms is to reduce the strength of the rf drive signal applied to the laser. However, this technique is not generally suitable because reducing the level of an rf drive signal will normally reduce the carrier-to-noise (C/N) ratio which can also degrade the quality of a television picture.

One suitable prior art solution for reducing the effects of CSO and CTB distortion products in a lightwave transmission system involves the use of a predistortion technique in which a predistorter is placed in the transmitter before the laser. The predistorter functions to add a controlled amount of distortion to an rf drive signal that modulates the laser. If the magnitude of the added distortion introduced by the predistorter is the same as that produced by the laser, and the phase of that added distortion is 180 degrees different from that of the distortion produced by the laser, the added distortion will effectively cancel the distortion produced by the laser.

Thus it has been the general practice in lightwave transmission systems to employ predistortion techniques that drive out-of-limit distortion levels to acceptable levels, or that increase the magnitude of rf drive signals to improve the C/N ratio while still keeping unwanted distortion levels within specified limits. However, one of the most critical problems confronting designers of lightwave transmission systems has been optimizing their performance without increasing power consumption and/or costs. The present invention addresses this problem.

SUMMARY OF THE INVENTION

This invention provides a predistortion technique for reducing distortion of a transmitted signal. A controlled amount of distortion is added to a radio-frequency (rf) signal. The magnitude of the added distortion approximates the distortion inherently present in the transmitted signal and is substantially 180 degrees out of phase therewith. Hence, the added amount of controlled distortion cancels or at least significantly reduces the distortion in the transmitted signal.

A specific aspect of the invention is directed to a lightwave transmitter comprising a signal conditioner, a predistorter, an rf amplifier circuit and a laser. The signal conditioner processes rf signals received from an rf input circuit. The processed rf signals are passed to the predistorter, which splits the rf signals into two portions. One of the split portions, which includes a major amount of the rf signal, passes through a delay circuit to an input of the combiner. The other split portion passes to diode circuits that selectively generate second- and third-order distortion products. The distortion products are combined, amplified and combined with the output of the delay circuit to form an rf drive signal that, when amplified, drives the laser.

Another aspect of the invention includes a predistorter for selectively distorting rf signals. A source of the rf signals connects to a signal distortion device, which generates selective distortion products of the rf signal. The signal distortion device combines the selective distortion products to form combined distortion products at a first output and transmits a delayed version of the rf signals to a second output. A low-power rf amplifier connects to the first output for adjusting the magnitude of the combined distortion products with respect to the magnitude of the delayed version of the rf signals. A signal combiner connects to the low-power rf amplifier and the second output.

A further aspect of the invention comprises a lightwave transmission system for transmitting a modulated laser beam comprising a source of rf signals and a laser for generating a modulated laser beam with laser-generated distortion products in response to a laser drive signal. A predistorter connects to the source of rf signals for generating selective distortion products of the rf signals that correspond to the laser-generated distortion products. A combiner circuit combines the selective distortion products to form a combined distortion signal. A low-power rf amplifier connects to the output of the combiner for adjusting the magnitude of the combined distortion signal with respect to an undistorted rf signal. A high-power amplifier connects to the combiner for forming the laser drive signal such that the selective distortion products are equal to and substantially 180 degrees out of phase with the laser-generated distortion products.

Still another aspect of the invention is a lightwave transmission method for transmitting a modulated laser beam comprising the steps of: generating a source of rf signals; generating the modulated laser beam with laser-generated distortion products in response to a laser drive signal; generating selective distortion products of the rf signals that approximate the laser-generated distortion products; combining the selective distortion products to form combined distortion products; transmitting a delayed version of the rf signals; adjusting the magnitude of the combined distortion products with respect to the delayed version of the rf signals;

and forming the laser drive signal by combining the combined distortion products with the delayed version of the rf signals such that the phase of the combined distortion products in the drive signal are substantially 180 degrees out of phase with the laser-generated distortion products.

These and other features of the invention are described in the following description of an illustrative embodiment of the invention when taken with the accompanying drawings. The scope of the invention, however, is limited only by the claims appended hereto.

BRIEF DESCRIPTION OF THE DRAWINGS

The present invention is described in detail below in conjunction with the drawings, of which:

FIG. 3 shows a simplified block diagram of a preferred embodiment of a lightwave transmitter in accordance with the present invention;

FIG. 4 shows a simplified block diagram showing details of a predistorter section of the lightwave transmitter of FIG. 3;

DETAILED DESCRIPTION OF AN ILLUSTRATIVE EMBODIMENT

Figure 1:
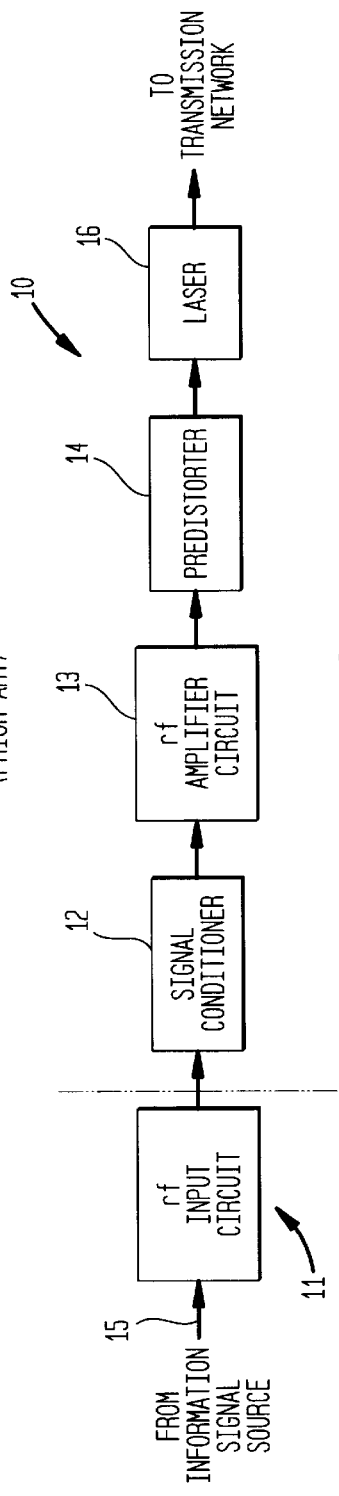
FIG. 1 shows a simplified block diagram of an illustrative prior art lightwave transmitter useful in understanding the present invention.

Referring now to the drawings, FIG. 1 shows a simplified block diagram showing rf input circuit 11 connected to a prior art lightwave transmitter 10, which comprises signal conditioner 12, high-power rf amplifier circuit 13, predistorter 14 and laser 16 organized in tandem. Terminal 15 of rf circuit 11 receives information signals, e.g., audio and/or video signals, from one or more conventional signal sources, e.g., a satellite antenna system, a television server network, or the like. In conventional CTV systems, as discussed above, the output of rf circuit 11 may be a series of frequency multiplexed rf signals having over a hundred separate channels usually starting at about 50 MHz and ending at about 750 MHz.

Signal conditioner 12 normally contains conventional circuit elements that condition the rf output from rf circuit 11 so that the rf drive signals at laser 16 will have the appropriate parameters. For example, signal conditioner 12 typically includes: rf attenuators, which reduce the signal amplitudes; slope adjusting elements, which maintain substantially equal level outputs for all rf channels; and impedance matching elements, which reduce signal distortions due to impedance mismatches. Rf amplifier circuit 13 helps regulate the level of the rf drive signal at laser 16, and attain adequate levels of controlled distortion in the rf drive signal. As such, for most lightwave transmitters, rf amplifier circuit 13 must operate at high power levels and be extremely linear, often resulting in the consumption of a substantial amount of power with the dissipation of a significant amount of heat.

Predistorter 14, which follows rf amplifier circuit 13, drives laser 16. Predistorter 14 comprises conventional electronic circuits which generate distortion signals that reduce the distortion products inherently generated by laser 16. As discussed above, when laser 16 is biased properly and not driven too hard, the distortion terms in a laser's transfer function will be predominately contained in second- and third-order terms, i.e., the CSO and CTB terms, respectively. Consequently, predistorter 14 selectively distorts the laser's rf drive signal so that the distortion products generated by laser 16 will be canceled or at least reduced significantly. Predistorter 14 selectively distorts the rf signal to essentially introduce CSO and CTB distortion products that are similar to the corresponding CSO and CTB distortion products normally created by laser 16 but are 180 degrees out of phase therewith, causing these distortion products to substantially cancel each other out.

Figure 2:
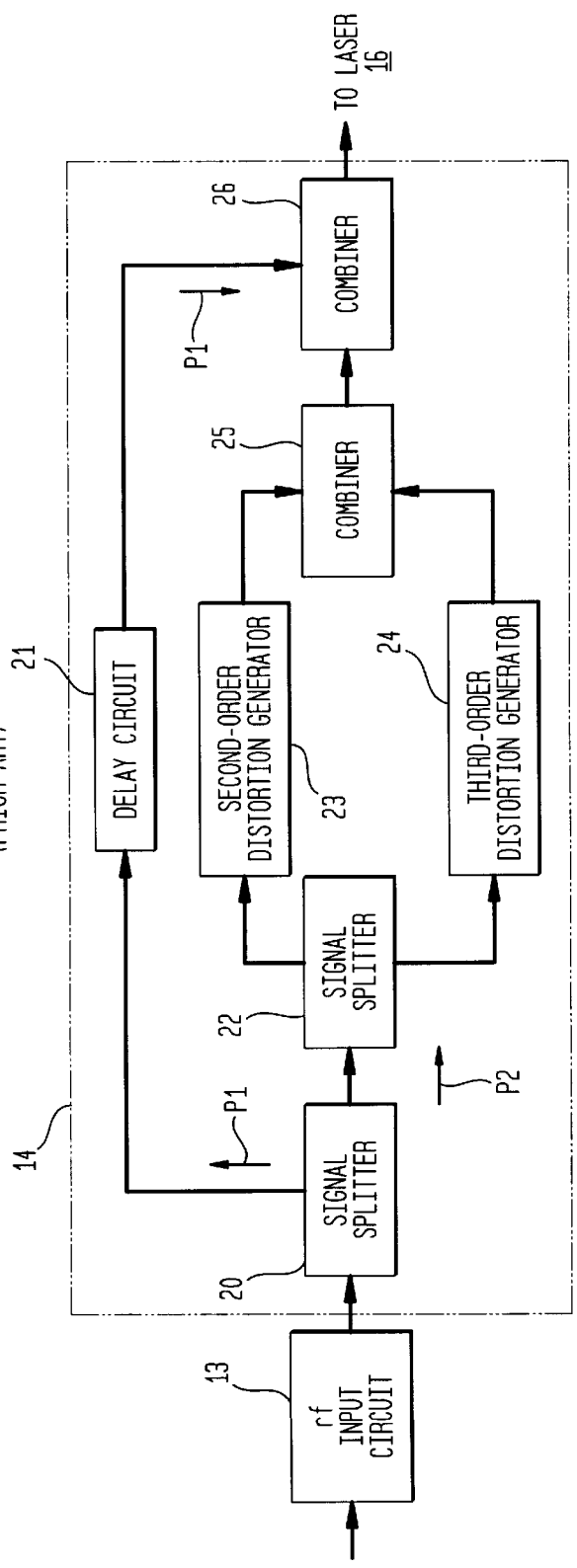
FIG. 2 shows a simplified block diagram of a section of the prior art lightwave transmitter of FIG. 1, showing a conventional predistorter in greater detail.

FIG. 2 shows a typical prior art predistorter 14 in greater detail. Signal splitter 20 splits the main rf signal at the output of rf amplifier circuit 13 into two paths, a direct path P1, and a distortion-generating path P2. Signal splitter 20 selectively splits the main rf signal such that the portion to be selectively distorted will generate distortion products of sufficient magnitude to cancel the distortion products of laser 16. In this regard, signal splitter 20 will normally direct a major portion, typically in the order of about ninety percent, of the rf signal into direct path P1, while the remaining fractional portion of the rf signal, say ten percent, passes to distortion-generating path P2.

Direct path P1 contains delay circuit 21, while distortion-generating path P2 contains signal splitter 22, second-order distortion generator 23, third-order distortion generator 24, and combiner 25. Delay circuit 21 introduces a signal delay between splitter 20 and combiner 26 via direct path P1, so that the resulting delay appropriately compensates for the delay introduced by the components in distortion-generating path P2. In this regard, the delays through distortion generators 23 and 24 must also be equalized.

Signal splitter 22 divides its fractional portion of the rf signal into two smaller portions, usually of substantially equal strength. Signal splitter 22 feeds one of these smaller portions to the input of second-order distortion generator 23 and the other smaller portion to the input of third-order distortion generator 24. Second-order distortion generator 23 comprises a nonlinear electronic circuit designed to generate even-order distortion products, i.e., second order, fourth order, sixth order, etc., while suppressing odd-order distortion products. Due to the level of the rf input signal, second-order distortion generator 23 generates mostly second-order distortion products. Third-order distortion generator 24 comprises a nonlinear electronic circuit designed to generate odd-order distortion products, i.e., first order, third order, fifth order, etc., while suppressing even-order distortion products. Due to the level of the rf input signal, third-order distortion generator 23 generates mostly first-order (i.e., the fundamental which is the main rf signal) and third-order products; the levels of the first-order products would be greater than that of the second- and third-order products.

The outputs of distortion generators 23 and 24 are combined in combiner 25. As such, combiner 25 forms combined distortion products having first- (fundamental), second- and third-order products. Combiner 25 feeds the combined distortion products to combiner 26, which forms an rf drive signal for laser 16. Combiner 26 combines that portion of the main rf signal in direct path P1 with the combined distortion signal such that laser 16 is driven with a signal comprising the main rf signal and a controlled amount of second- and third-order distortion products that are substantially 180 degrees out of phase with the corresponding distortion products to be generated by laser 16. Consequently, the conventional predistortion technique, depicted in FIGS. 1 and 2, can be used to significantly reduce the signal distortions generated by laser 16.

The major disadvantage of the conventional transmitter arrangement of FIGS. 1 and 2 is the added stress that predistorter 14 places on rf amplifier circuit 13. When positioning predistorter 14 after rf amplifier circuit 13, as shown in FIGS. 1 and 2, the power output of rf amplifier circuit 13 must be increased substantially to overcome the loss of rf signal as it passes through predistorter 14 while providing sufficient power to produce an rf drive signal having adequate levels of the second- and third-order distortion products. Due to this additional output power requirement, unwanted distortions generated by rf amplifier circuit 13 can increase significantly. Consequently, with prior art predistortion techniques, either the performance of transmitter 10 is degraded, or rf amplifier circuit 13 is replaced with a higher power amplifier, causing additional cost and power consumption.

FIG. 3 shows a generalized block diagram of a preferred embodiment of lightwave transmitter 10' in accordance with the present invention. Like the prior art transmitter 10 of FIGS. 1 and 2, transmitter 10' generates a laser drive signal containing a controlled amount of second- and third-order distortion products that are substantially 180 degrees out of phase with the corresponding distortion products inherently generated by laser 16. As will become clear below, transmitter 10' provides enhanced transmitter operation while using less power and being less costly to fabricate.

Lightwave transmitter 10' includes signal conditioner 12, predistorter 14', rf amplifier circuit 13 and laser 16. Terminal 15 of rf input circuit 11 receives information signals, e.g., audio and/or video signals. Rf input circuit 11 and signal conditioner 12 function in substantially the same manner as described above with respect to these items in the system of FIG. 1.

Predistorter 14', which follows signal conditioner 12 and precedes rf amplifier circuit 13, comprises electronic circuits for generating second- and third-order distortion products that will be used to reduce the distortion generated by laser 16. In the prior art lightwave transmitter 10, rf amplifier circuit 13 precedes predistorter 14, while in lightwave transmitter 10', rf amplifier circuit 13 follows predistorter 14'. Consequently, in lightwave transmitter 10', the output power that rf amplifier circuit 13 is required to generate is reduced by amount equal to the loss associated with predistorter 14'. In other words, placing rf amplifier circuit 13 after predistorter 14', instead of before, allows rf amplifier circuit 13 to operate at a lower power level since it is no longer required to overcome the rf loss associated with predistorter 14'. The amplifier-predistorter arrangement in lightwave transmitter 10', however, places certain constraints on predistorter 14'. For instance, since the rf input power to predistorter 14' will now be too low to produce adequate levels of controlled distortion, gain circuitry must be added to perform this function. However, the added gain circuitry must not appreciably increase the overall power consumption and/or the fabrication costs.

FIG. 4 illustrates a preferred implementation of predistorter 14'. The output of signal conditioner 12 connects to the input of signal splitter 60, which splits the main rf input signal along two paths, a relatively non-distorting direct path P3, and a distortion-generating path P4. Signal splitter 60 would typically direct a major portion, in the order of about ninety percent, of the main rf signal along direct path P3, while the remaining fractional portion, say ten percent, passes to distortion-generating path P4.

Direct path P3 contains delay circuit 61, while distortion-generating path P4 contains signal splitter 62, second-order distortion generator 63, third-order distortion generator 64, and combiner 65. Delay circuit 61 introduces a signal delay to path P3 that compensates for a corresponding delay introduced by the components in path P4. Additionally, the delays through distortion generators 63 and 64 are equalized.

Signal splitter 62 divides its fractional portion of the rf signal into two smaller portions of substantially equal magnitude. Signal splitter 62 feeds one of these smaller portions to the input of second-order distortion generator 63 and the other smaller portion to the input of third-order distortion generator 64.

Figure 5:
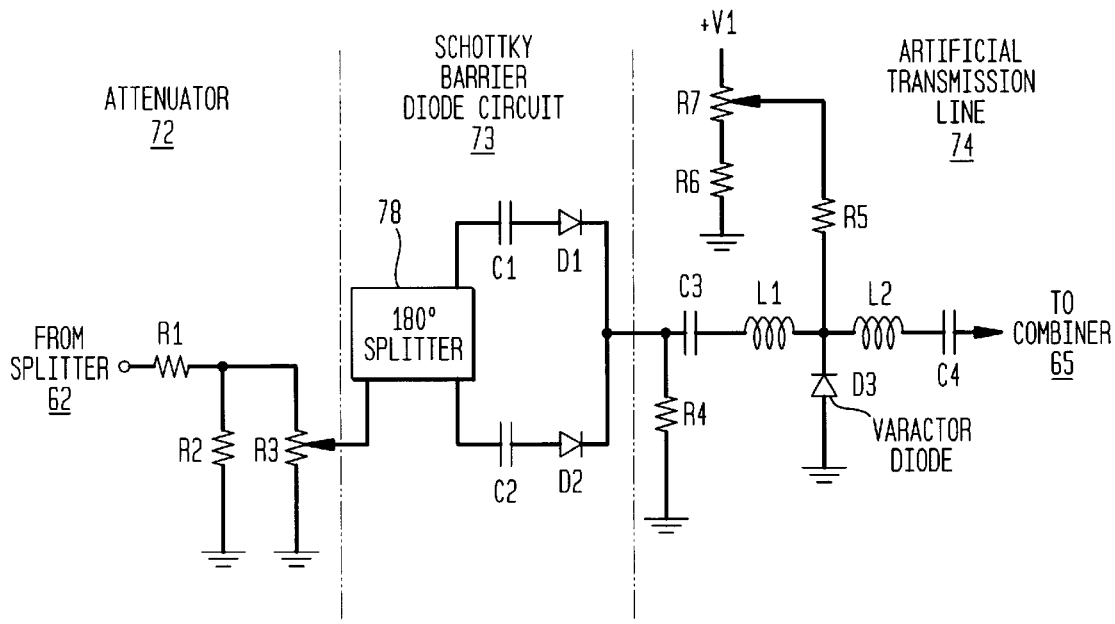
FIG. 5 shows a schematic circuit diagram showing a preferred second-order distortion generator for use in the predistorter of FIG. 4.

Second-order distortion generator 63 comprises a nonlinear electronic circuit, shown in detail in FIG. 5, that is designed to suppress odd-order distortion products while generating even-order distortion products, i.e., second order, fourth order, sixth order, etc. Due to the low level of its input signal, second-order distortion generator 63 mostly generates the second-order distortion products. Third-order distortion generator 64 comprises a nonlinear electronic circuit, shown in greater detail in FIG. 6, that is designed to suppress even-order distortion products while generating odd-order distortion products, i.e., first order, third order, fifth order, etc. Due to the level of the input signal, the nonlinear circuit of third-order distortion generator 63 generates mostly first-order (i.e., the fundamental or main rf signal) and third-order products. In a manner to be described in detail with respect to the circuit of FIG. 6, third-order distortion generator 63 includes circuitry for substantially canceling the first-order products. Consequently, the output of third-order distortion generator 63 primarily comprises only the third-order distortion products. The outputs of distortion generators 63 and 64 are combined in combiner 65 to form combined distortion products comprising second- and third-order products. Combiner 65 feeds low-power rf amplifier circuit 52, which raises the level of the combined distortion products a predetermined amount with respect to the level of the undistorted portion of the rf signal at the output of delay circuit 61.

The outputs of low-power rf amplifier circuit 52 and delay circuit 61 connect to different inputs of combiner 53, which feeds high-power rf amplifier circuit 13 with an rf signal having a controlled amount of distortion. Thus, the input signal to rf amplifier circuit 13 will comprise an undistorted portion, made up of the main rf signal from direct path P3, plus the controlled amount of second- and third-order distortion products from low-power rf amplifier 52.

The output rf signal from predistorter 14' is sufficiently amplified by high-power rf amplifier circuit 13 to adequately drive laser 16 while generating the necessary second- and third-order distortion products at a 180 degree phase difference with respect to corresponding distortion products inherently generated by laser 16. Hence, the usual signal distortions generated by laser 16 will be canceled or at least reduced significantly.

As indicated above, a major advantage of transmitter 10' is the reduced requirements placed on rf amplifier circuit 13.

Hence, the magnitude of the rf drive signal can be readily increased while keeping unwanted distortion levels within acceptable limits, thereby enhancing transmitter performance by improving the C/N ratio. Additionally, low-power rf amplifier circuit 52 may simply be an inexpensive, low-power semiconductor chip amplifier.

FIGS. 5–8 illustrate preferred circuit implementations of the elements of transmitter 10'. In the interest of clarity, some of the conventional bias, bypassing and blocking components, which will be apparent to those skilled in the art, are not included in these circuits. FIG. 5 illustrates a preferred implementation of second-order distortion generator 63. The input end of distortion generator 63, which connects to an output of signal splitter 62, includes variable attenuator 72, Schottky barrier diode circuit 73 and artificial transmission line 74. Variable attenuator 72, which controls the signal input level, includes fixed resistors R1 and R2, and variable resistor R3, which may be designed to present the most favorable return loss while still covering the required attenuation range.

Schottky barrier diode circuit 73 comprises a pair of parallel Schottky barrier diodes D1 and D2 connected to variable resistor R3 via coupling capacitors C1 and C2, and 180-degree splitter 71. Splitter 71 feeds diodes D1 and D2 with rf signals of substantially equal levels that are 180 degrees out of phase. In response, diode circuit 73 produces even-order distortion products, which are fed to artificial transmission line 74. Transmission line 74 is formed from a conventional configuration of the following elements: inductors L1 and L2; capacitors C3 and C4; fixed resistors R4, R5 and R6; variable resistor R7; varactor diode D3; and bias voltage source +V1. The effective length of artificial transmission line 74, which feeds an input of combiner 65, will be controlled by the capacitance of varactor diode D3 which can be controlled by variable resistor R7. The signal delay through the artificial transmission line 74 will be frequency dependent and primarily effective at high frequencies. Consequently, variable resistor R7 functions as a vernier phase adjustment for the higher channels.

Figure 6:
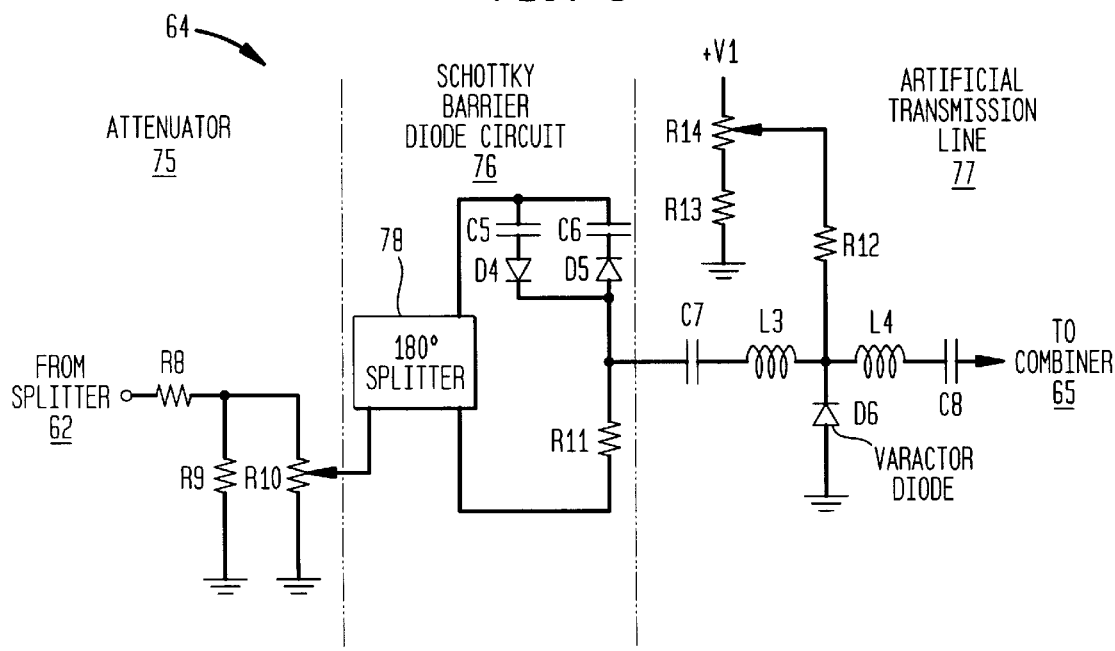
FIG. 6 shows a schematic circuit diagram showing a preferred third-order distortion generator for use in the predistorter of FIG. 4.

FIG. 6 illustrates a preferred implementation of third-order distortion generator 64. The input end of distortion generator 64, which connects to an output of signal splitter 62, includes variable attenuator 75, Schottky barrier diode circuit 76 and artificial transmission line 77. Variable attenuator 75, which includes fixed resistors R8 and R9, and variable resistor R10, controls the input level to distortion generator 64 and may be designed to present the most favorable return loss while still covering the required attenuation range.

Schottky barrier diode circuit 76 comprises 180-degree splitter 78, having an input connected to variable resistor R10, and two outputs that split the rf signal into two parts, each 180 degrees out of phase. One output of splitter 78 feeds, via capacitors C5 and C6, a pair of oppositely polarized Schottky barrier diodes D4 and D5 with substantially equal-level rf signals that are in phase. In response, diodes D4 and D5 produce odd-order distortion products including the first-order products.

Figure 7:
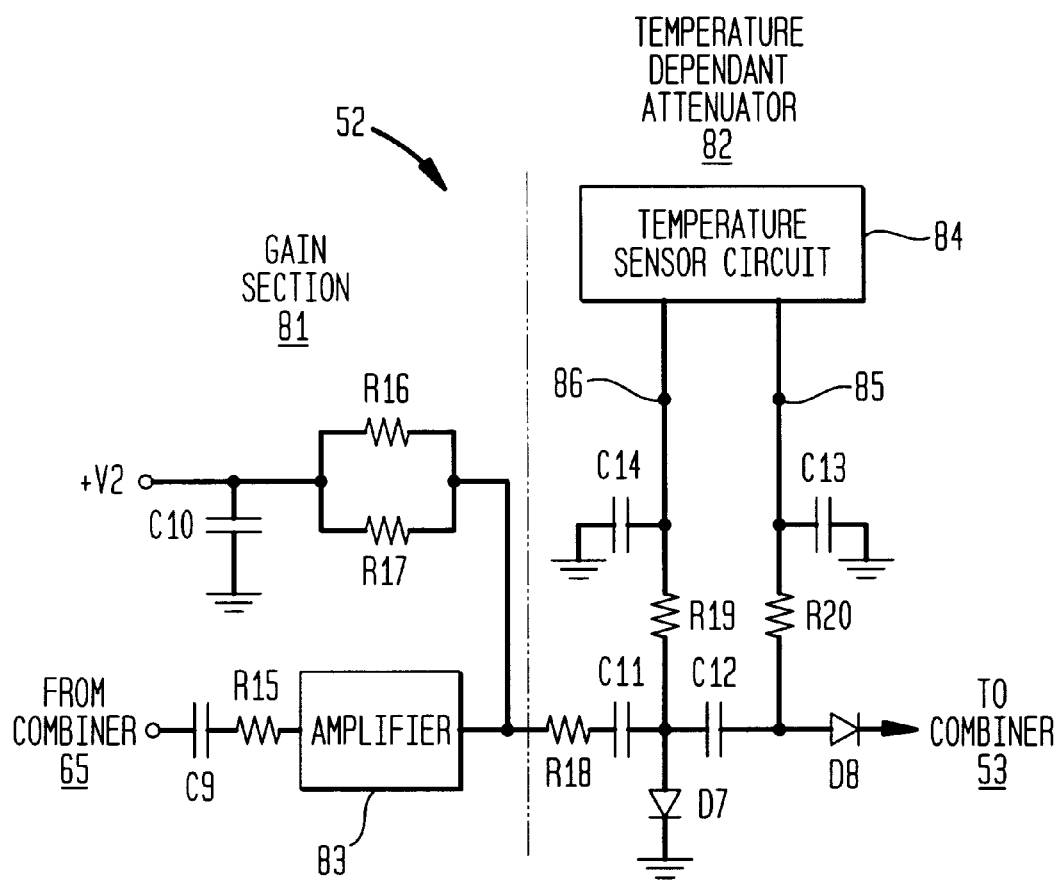
FIG. 7 shows a schematic circuit diagram showing a preferred rf amplifier circuit for use in the lightwave transmitter of FIG. 3.

Ordinarily, the first-order products would be large enough to generate additional distortion products in the relatively low-power rf amplifier circuit 52 (see FIGS. 4 and 7). Diode circuit 76 cancels the first-order products by combining, via resistor R11, the outputs of diodes D4 and D5 with the 180-degree out-of-phase signal from the second output of 180-degree splitter 78. Consequently, diode circuit 76 generates an rf signal that primarily contains the third-order distortion products only. Artificial transmission line 77, which receives the third-order distortion products from diode circuit 76, is similar to transmission line 74. Specifically, transmission line 77 comprises: inductors L3 and L4; capacitors C7 and C8; fixed resistors R12 and R13; variable resistor R14; varactor diode D6; and bias voltage source +V 1. The effective length of transmission line 77 is controlled by the capacitance of varactor diode D6 which is controlled by variable resistor R14. The signal delay through transmission line 77 will be frequency dependent and is primarily effective at high frequencies. Consequently, variable resistor R14 may function as a vernier phase adjustment for the higher channels. The output of artificial transmission line 77 feeds an input of combiner 65.

FIG. 7 illustrates a preferred implementation of low-power rf amplifier circuit 52. Of course, it is critical that predistorter 14' not generate appreciable levels of unwanted distortion. In this regard, the nonlinear operation of diodes D1, D2, D4 and D5 is normally temperature sensitive and can result in generating unwanted distortion. Rf amplifier circuit 52 is, therefore, designed to perform two main functions. First, rf amplifier circuit 52 amplifies the combined distortion products to a predetermined level with respect to the undistorted signal from delay line 61. Second, rf amplifier circuit 52 provides temperature-sensitive amplification so as to compensate for any unwanted variations in the distortion products from predistorter 14' resulting from changes in the ambient temperature.

More specifically, rf amplifier circuit 52 includes gain section 81 and temperature dependent attenuator 82. Gain section 81 comprises low-power amplifier 83 having an input coupled to the output of combiner 65 via coupling capacitor C9 and resistor R15. Voltage source +V2 connects to capacitor C10 and to the output of amplifier 83 via parallel resistors R16 and R17. Temperature dependent attenuator 82 couples the output of amplifier 83 to an input of combiner 53. Attenuator 82 comprises resistor 18 and PIN diodes D7 and D8. Capacitors C11 and C12 provide a direct-current block. Resistors R19 and R20 regulate the currents to PIN diodes D7 and D8. Temperature sensor circuit 84 has two output terminals 85 and 86 connected to bypass capacitors C13 and C14, respectively. The anode of PIN diode D7 connects to terminal 86 via the main signal path and resistor R19. The cathode of diode D7 connects to ground. The anode of PIN diode D8 connects to output terminal 85 via resistor R20. The output of rf amplifier circuit 52, which feeds combiner 53, is taken from the cathode of diode D8.

Temperature-dependent attenuator 82 varies the input to combiner 53 as a function of the ambient temperature to compensate for variations in the distortion levels due to the ambient temperature dependence of Schottky diodes D1, D2, D4 and D5. Specifically, temperature sensor circuit 84, which senses the ambient temperature, outputs diode drive signals at terminals 85 and 86 to vary the resistances of PIN diodes D7 and D8 as a function of the ambient temperature and the temperature response of Schottky diodes D1, D2, D4 and D5.

Conventional fabrication techniques can be used to produce a highly serviceable, low-cost implementation of transmitter 10'. Rf amplifier circuit 52, combiner 53 and most of predistorter 14' may be readily fabricated as a two-layer printed circuit with one multipin connector that brings the voltages +V1, -V1 and +V2 to a circuit board. As exemplary, V1 may equal five volts while V2 equals 24 volts. Hence, a conventional semiconductor small-chip amplifier may be used to implement low-power amplifier 83. Further, two simple coaxial cables may be used to provide the rf signal input and output. Delay circuit 61 may be implemented with a length of coaxial cable, and a parallel resistor-capacitor circuit connected in series with the cable may be included to compensate for any negative slope that may be introduced by splitter 60 and combiner 53.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claim is reserved.

What is claimed is:

1. A predistorter for selectively distorting radio-frequency (rf) signals comprising:

a source of said rf signals;

signal distortion means connected to said source of rf signals for generating selective second-order and selective third-order signal distortion products of said rf signal, for combining said selective distortion products to form combined distortion products at a first output, and for transmitting a delayed version of said rf signals to a second output;

a low-power rf amplifier means connected to said first output for amplifying the magnitude of said combined distortion products with respect to the magnitude of said delayed version of said rf signals; and a signal combiner connected to said low-power amplifier means and said second output, wherein said combined output contains said second-order and third-order signal distortion products.

2. The predistorter of claim 1 wherein said signal distortion means includes nonlinear circuitry for generating said selective second-order distortion products and said selective third-order distortion products.

3. The predistorter of claim 2 wherein said signal distortion means includes a signal splitter means connected to said source of rf signals for splitting said rf signals into a major portion, and into first and second fractional portions of substantially equal magnitude, said major portion being transmitted as said delayed version of said rf signals, said first fractional portion being used to generate said selective second-order distortion products, and said second fractional portion being used to generate said selective third-order distortion products.

4. The predistorter of claim 3 wherein said nonlinear circuitry includes a second-order distortion generator and a third-order distortion generator.

5. The predistorter of claim 4 wherein said third-order distortion generator includes diode means for generating odd-order products while suppressing first-order products.

6. The predistorter of claim 5 wherein said signal distortion means includes a delay circuit for transmitting said delayed version of said rf signals, and said signal combiner connects to said delay circuit.

7. The predistorter of claim 6 wherein said low-power rf amplifier means includes a temperature-sensitive means for adjusting said selective distortion products as a function of the ambient temperature and the temperature response of said nonlinear circuitry.

8. A lightwave transmitter for transmitting a modulated laser beam comprising:

a source of radio-frequency (rf) signals;

laser means for generating said modulated laser beam with laser-generated distortion products in response to a laser drive signal;

signal distortion means connected to said source of rf signals for generating a distorted signal with selective second-order and selective third-order distortion products of said rf signals that correspond to said laser-generated distortion products;

low-power amplifier means connected to said signal distortion means for controlling the level of said distorted signal by amplifying said distorted signal;

combiner means connected to said low-power amplifier means and said source of rf signals for combining selective amounts of said distorted signal and an undistorted version of said rf signals to form an rf drive signal with a controlled amount of said selective second-order and selective third-order distortion products that are substantially 180 degrees out of phase with said laser-generated distortion products; and a high-power amplifier means connected to the output of said combiner means for feeding said laser drive signal to said laser means.

9. The transmitter of claim 8 wherein said laser-generated distortion products include second-order and third-order distortion products, and said distortion means includes nonlinear circuitry for generating said selective second-order and third-order distortion products and for suppressing first-order products.

10. The transmitter of claim 9 wherein said nonlinear circuitry includes a second-order distortion generator and a third-order distortion generator.

11. The transmitter of claim 10 wherein said third-order distortion generator includes diode means for generating odd-order products while suppressing first-order products.

12. The transmitter of claim 11 wherein said combiner means connects to said source of rf signals via a delay circuit.

13. The transmitter of claim 12 wherein said low-power rf amplifier means includes a temperature-sensitive means for adjusting said selective distortion products as a function of the ambient temperature and the temperature response of said nonlinear circuitry.

14. A lightwave transmitter for transmitting a modulated laser beam comprising:

a source of radio-frequency (rf) signals;

laser means for generating said modulated laser beam with laser-generated distortion products in response to a laser drive signal;

signal distortion means connected to said source of rf signals for generating selective second-order and selective third-order distortion products of said rf signal that correspond to said laser-generated distortion products, for combining said selective distortion products to form combined distortion products at a first output, and for transmitting a delayed version of said rf signals to a second output;

a low-power rf amplifier means connected to said first output for amplifying the magnitude of said combined distortion products with respect to the magnitude of said delayed version of said rf signals;

a signal combiner connected to said low-power amplifier means and said second output wherein said signal combiner output includes said selective second-order and selective third-order distortion products; and laser drive means connected to said signal combiner and said laser for generating said laser drive signal with a sufficient level of said combined distortion products to match said laser-generated distortion products and to be substantially 180 degrees out of phase with said laser-generated distortion products.

15. The transmitter of claim 14 wherein said laser-generated distortion products include second-order and third-order distortion products, and said signal distortion means includes nonlinear circuitry for generating said selective second-order and third-order distortion products.

16. The transmitter of claim 15 wherein said signal distortion means includes a signal splitter means connected to said source of rf signals for splitting said rf signals into a major portion, and into first and second fractional portions of substantially equal magnitude, said major portion being transmitted as said delayed version of said rf signals, said first fractional portion being used to generate said selective second-order distortion products, and said second fractional portion being used to generate said selective third-order distortion products.

17. The transmitter of claim 16 wherein said nonlinear circuitry includes a second-order distortion generator and a third-order distortion generator.

18. The transmitter of claim 17 wherein said third-order distortion generator includes diode means for generating odd-order products while suppressing first-order products.

19. The transmitter of claim 18 wherein said signal distortion means includes a delay circuit for transmitting said delayed version of said rf signals, and said signal combiner connects to said delay circuit.

20. The transmitter of claim 19 wherein said low-power rf amplifier means includes a temperature-sensitive means for adjusting said selective distortion products as a function of the ambient temperature and the temperature response of said nonlinear circuitry.

21. A radio-frequency (rf) signal predistortion method comprising:

generating said rf signals;

generating selective second-order and selective third-order distortion products of said rf signals;

combining said selective distortion products to form combined distortion products;

transmitting a delayed version of said rf signals;

amplifying the magnitude of said combined distortion products in relation to said delayed version of said rf signals; and combining said combined distortion products with said delayed version of said rf signals to form a distorted rf signal with a controlled amount of second-order and third-order distortion.

22. The method of claim 21 wherein generating said selective distortion products includes generating, in a nonlinear circuit, selective second-order distortion products and third-order distortion products while suppressing first-order products.

23. The method of claim 22 wherein said step of generating selective distortion products includes splitting said rf signals into a major portion, and into first and second fractional portions of substantially equal magnitude, transmitting said major portion as said delayed version of said rf signals, generating said selective second-order distortion products from said first fractional portion; and generating said selective third-order distortion products from of said second fractional portion by generating odd-order products and suppressing first-order products.

24. The method of claim 23 further including adjusting the magnitudes of said selective distortion products as a function of the ambient temperature and the temperature response of said nonlinear circuit.

25. A lightwave transmission method for transmitting a modulated laser beam comprising: generating a source of radio-frequency (rf) signals:

generating said modulated laser beam with laser-generated distortion products in response to a laser drive signal;

generating selective second-order and third-order distortion products of said rf signals that approximate said laser-generated distortion products;

combining said selective second-order and third-order distortion products to form combined distortion products;

transmitting a delayed version of said rf signals;

adjusting the magnitude of said combined distortion products by amplification with respect to said delayed version of said rf signals; and forming said laser drive signal by combining said combined distortion products with said delayed version of said rf signals such that the phase of said combined second-order and third-order distortion products in said drive signal are substantially 180 degrees out of phase with said laser-generated distortion products.

26. The method of claim 25 wherein said laser-generated distortion products include second-order and third-order distortion products, and said step of generating said selective distortion products includes generating, in a nonlinear circuit, selective second-order distortion products and selective third-order distortion products.

27. The method of claim 26 wherein said step of generating selective distortion products includes splitting said rf signals into a major portion, and into first and second fractional portions of substantially equal magnitude, transmitting said major portion as said delayed version of said rf signals, generating said selective second-order distortion products from said first fractional portion; and generating said selective third-order distortion products from of said second fractional portion by generating odd-order products and suppressing first-order products.

28. The method of claim 27 further including adjusting the magnitudes of said selective distortion products as a function of the ambient temperature and the temperature response of said nonlinear circuit.

* * * * *